Jan. 13, 1925.
S. SVENSON
MILKING STOOL
Filed July 20, 1922
1,522,984
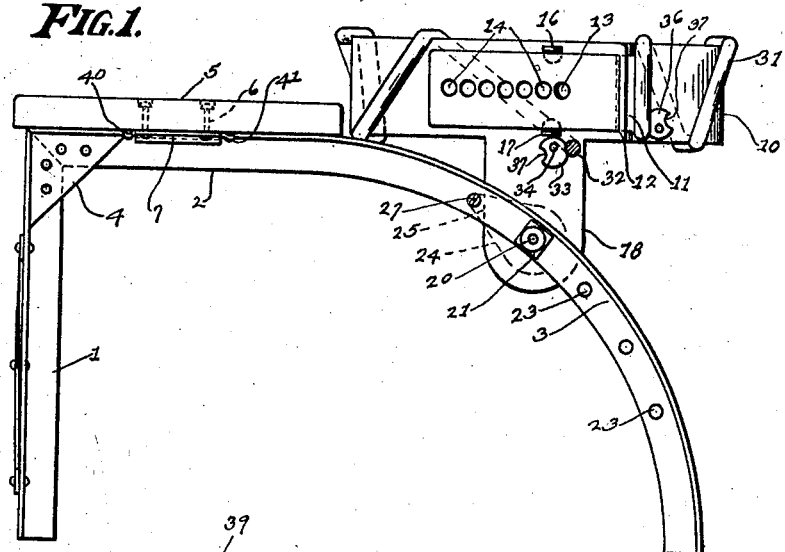
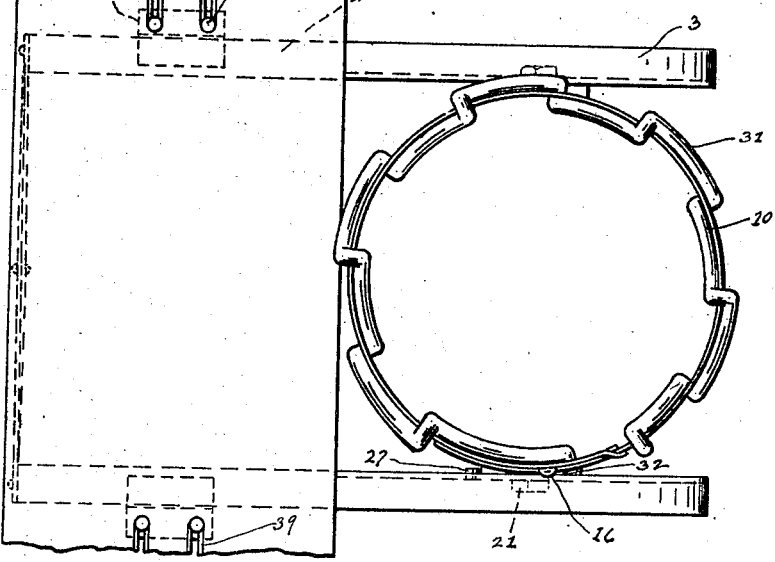
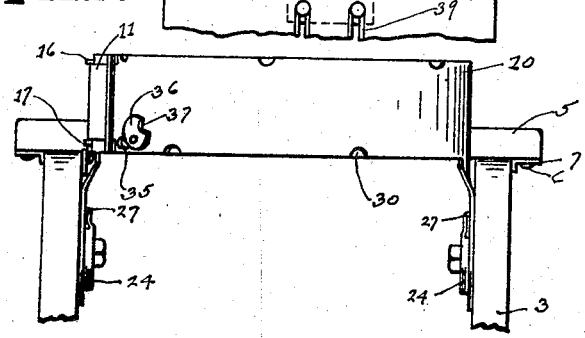
INVENTOR.
Sven Svenson
BY
ATTORNEYS.

Patented Jan. 13, 1925.

1,522,984

UNITED STATES PATENT OFFICE.

SVEN SVENSON, OF FOND DU LAC, WISCONSIN.

MILKING STOOL.

Application filed July 20, 1922. Serial No. 576,173.

*To all whom it may concern:*

Be it known that I, SVEN SVENSON, a citizen of the United States, residing at Fond du Lac, county of Fond du Lac, and State of Wisconsin, have invented new and useful Improvements in Milking Stools, of which the following is a specification.

My invention relates to improvements in milking stools.

The object of my invention is to provide a milking stool having a light metal frame and a broad base, ensuring stability and strength. Also to provide a milking stool with improved means for supporting a pail or milking receptacle and tilting the same at different angles.

A further object of my invention is to provide a milking stool having a pail support adapted to receive and securely hold a conically tapered pail without allowing the pail to bind in the support in such a manner that it can not be readily lifted and removed from the support.

As additional objects I provide an adjustable pail supporting metallic ring, the diameter of which may be varied to suit the requirements of pails of differing size. I also provide a non-metallic wrapping for the pail supporting ring which can be removed, cleansed, replaced, and secured in position on the ring quickly, handily, and conveniently, and which, when in position of use, will afford a yielding bearing for the pail at intervals along the ring and along helical lines or oblique lines, calculated to afford a secure bearing or set of bearings for the pail without allowing the latter to bind therein.

A further object of my invention is to provide improved means for adjusting the pail support at different elevations with reference to the milking stool, and for tilting the same to hold the pail at various angles.

In the drawings:

Figure 1 is a side elevation of my improved milking stool with the pail support adjusted to hold the pail in a vertical position and at a considerable elevation.

Figure 2 is a plan view of the same.

Figure 3 is a front view of the upper portion of the milking stool and pail support with the non-metallic pail receiving member or rope removed.

Like parts are identified by the same reference characters throughout the several views.

The frame of my improved milking stool comprises a pair of angle iron frame members laterally spaced in vertical planes and each comprising a vertical leg member 1, a horizontally extending, seat supporting member 2, and a forward leg member 3, which is downwardly curving to the vertical and preferably is integral with seat supporting member 2. All of such members preferably made of angle iron as shown and the vertical rear leg 1 may be joined to the horizontal seat supporting member 2 of each frame through the medium of a triangular corner brace 4 riveted to corresponding ends of the angle iron members illustrated at 1 and 2. Thus each of the frame members includes two legs rigidly connected together and, when such frame members are interconnected by means of the seat and the transverse brace herein disclosed, a four legged stool of great rigidity and strength is the result.

A seat 5 is mounted upon the horizontal flanges of the frame members 2 and is bolted thereto as shown. The bolts 6 preferably pass through laterally projecting clips 7 connected with the members 2, the specific means for connecting the seat, however, not being very material.

The pail support comprises a flexible metallic band 10, reduced at one end to form an elongated tongue 11 adapted to extend through a slot 12 in the other end portion of the band and to be secured thereto by a projection 13, preferably struck from one of the overlapping portions and engaged in any one of a series of apertures 14 formed in the other end portion of the band. The wider of the two overlapping portions is preferably provided with a set of lips 16 and 17 which may be struck up from said portion in a position to receive the tongue 11 between them, these lips 16 and 17 co-operating with the stud or projection 13 to hold the ends of the band in connected relation. The diameter of the ring thus formed by the band 10 may, of course, be varied by releasing the stud or projection 13 from the aperture in which it is engaged and re-engaging it in another one of the apertures 14.

On each side of the ring the band 10 is provided with a downwardly extending member 18 which constitutes a connecting member whereby the ring 10 may be secured to and supported from a frame portion 3 of the stool. These members 18 are clamped to the inwardly extending flange of the portion 3 by a connecting bolt 20 having a nut 21 preferably disposed underneath the overhanging flange of the portion 3.

The inturned flange of the member 3 is provided with a series of holes 23, each adapted to receive the bolt 20, and a resilient washer 24, interposed between the member 18 and the member 3 of the frame, is provided with an elongated and tapered portion 25 on one side, having its extremity bent at right angles to the plane of the washer to form a hook 27 adapted to engage in an aperture 23 at a distance from the aperture in which the bolt 20 is engaged, thereby preventing the washer from rotating. The washer 24 is somewhat dished and the clamping pressure exerted by the bolt 20 when turned into the nut 21 tends to flatten the washer and cause it to bind with sufficient resilient pressure upon the supporting members 18 to prevent them from swinging or tilting under the weight of the pail and its contents.

It is obvious that if a pail were adjusted or placed in the ring 10 with no intervening bearing members, the pail would not only have its outer surface scratched or marred by the ring, but when filled, it would tend to become wedged in the ring so that it could not be readily removed. To overcome these difficulties I provide the margins of the ring 10 with semi-circular notches 30 to receive a rope 31, preferably a fibrous rope, which engages in these notches and which may be wound in the form of a flattened helix about the ring.

One end of the rope extends through a hole 32 in the supporting member 18 and is anchored thereto by a clamping disk 33 eccentrically pivoted at 34 to the member 18. The other end of the rope extends through an aperture 35 in the ring (Figure 3), and is similarly secured by an eccentrically pivoted clamping disk 36. The clamping disks 33 and 36 are each preferably notched, as indicated at 37, whereby when they are adjusted with the notch in registry with the hole through which the rope is passed, the rope may be readily slipped through the hole, after which the clamping disk is rotated until the desired pressure upon the rope is obtained.

The milking stool above described has such a broad base that it is not easily tipped or turned over. The pail will be properly supported and easily removed, and even if handled by a careless person it will not be scratched or damaged and will not become wedged in the supporting ring. The friction washer, or washer shaped member 24, will exert sufficient resilient frictional pressure against the flat surfaces of the member 18 to prevent the pail and ring from tipping accidentally, although the ring may be manually tilted to hold the pail at any desired angle without loosening the clamping bolts. If the rope 31 becomes fouled, it can be almost instantly removed by turning the clamping disks 33 and 38 to releasing position, whereupon the rope may be cleansed and replaced.

In use the size of the ring may not only be adjusted in conformity with the size of the pail support but it may also be adjusted to conform with the diameter of the portion of the pail to be engaged. The pail may thus be supported at different elevations by changing the diameter of the ring to engage the pail support near the bottom or near the top, the standard pail being tapered. For extreme variations in the desired elevation of the pail the supporting members 18 may be raised and reclamped to the legs by adjusting the clamping bolts 20 through other holes 23 in the legs.

When the diameter of the ring 10 is increased or diminished materially, it is desirable to adjust the legs inwardly or outwardly. This may be accomplished by loosening the bolts 6 and clamping members 7, whereupon the members 2 may be moved inwardly or outwardly to a permissible extent dependent on the width of the horizontal flanges on the members 2, whereby they can be thus moved without disengaging them from the clamping members 7.

Additional movement may be permitted by providing the seat with slots 39, although these will not ordinarily be found necessary. The essential feature in this regard is the provision of means for moving these members 2 and the legs 3 outwardly or inwardly in correspondence with the diameter of the pail supporting ring and any means for accomplishing this adjustment may be utilized.

For the purpose of keeping the seat board 5 from shifting to the front or rear, in the event that the clamping bolts become loosened, lugs 40 and 41 projecting downwardly from the horizontal flange of angle bar 2 into engagement with the margins of clamping members 7 may be provided if desired.

I claim:

1. A milking stool comprising the combination of a frame provided with a seat, a pail holder adjustably secured to the frame, and means for preventing the pail from binding in the pail holder.

2. A milking stool comprising the combination of a frame provided with a seat and having forwardly extending frame members apertured at intervals, a band provided with depending ears adapted to be clamped to said frame members, clamping bolts extending through said ears and frame member apertures, and resiliently yielding friction members interposed between the respective ears and said frame members, and provided with hook-shaped arms engaged in adjacent frame member apertures to prevent tilting movements of the friction members.

3. A milking stool having a circular pail supporting band adjustably connected therewith, and a flexible member wound helically about said band and having end portions detachably secure.

4. A milking stool having a circular pail supporting band adjustably connected therewith, and a flexible member wound helically about said band and having end portions detachably connected thereto, said band having marginal notches to receive said flexible member.

5. A milking stool having a circular pail supporting band adjustably connected therewith, and a flexible member wound helically about said band and having end portions detachably connected thereto, said band having apertures to receive the flexible member, and clamping eccentrics located adjacent the apertures, and adapted to partially overlap them when in clamping position.

6. A pail support for milking stools, comprising a ring provided with detachable bearing members.

7. A pail support for milking stools provided with non-metallic pail receiving bearing members.

8. A pail support for milking stools comprising the combination of a metallic ring, means for supporting the ring from the stool, and non-metallic bearing projections on the inner face of the ring adapted to support the pail when the latter is inserted in the ring.

9. A pail support for milking stools comprising the combination of a metallic ring, means for supporting the ring from the stool, and non-metallic bearing projections on the inner face of the ring adapted to support the pail when the latter is inserted in the ring, said bearing members being disposed for engagement with the pail on all sides.

10. A pail support for milking stools comprising the combination of a metallic ring, means for supporting the ring from the stool, and non-metallic bearing projections on the inner face of the ring adapted to support the pail when the latter is inserted in the ring, said bearing members comprising portions of a rope wound upon the ring in a circular coil, the turns of which conform generally to the cross sectional form of the ring.

11. A milking stool comprising the combination of a frame including a set of members extending forwardly and downwardly in supporting relation to the front portion of the frame, an expansible ring connected with said members, and a seat provided with clamping devices adapted to adjustably engage said members to allow the members to be separated or brought toward each other in correspondence with the diameter of the pail supporting ring.

12. A pail support including an annulus and contact members spaced interiorly about the circumference thereof and adapted for contact with a pail inserted therein.

13. A pail support including a hoop having a helical winding providing spaced interiorly projecting contact portions for carrying a pail without binding.

14. A pail support including a hoop having a helical winding providing spaced interiorly projecting contact portions for carrying a pail without binding, said winding comprising a non-metallic member.

SVEN SVENSON.